United States Patent [19]

Mark, deceased et al.

[11] Patent Number: 4,751,264
[45] Date of Patent: Jun. 14, 1988

[54] POLYESTER CARBONATE CONTAINING DIVALENT RESIDUE OF POLYMERIZED, PARTIALLY HYDROGENATED CONJUGATED ALKADIENE MONOMER

[75] Inventors: Victor Mark, deceased, late of Evansville, Ind., by Carol M. Mark, legal representative; Ester H. Mark, legal representative, Springville, N.Y.; Edward N. Peters, Lenox, Mass.

[73] Assignee: General Electric Company, Mt. Vernon, Ind.

[21] Appl. No.: 54,334

[22] Filed: May 26, 1987

Related U.S. Application Data

[62] Division of Ser. No. 797,253, Nov. 12, 1985, Pat. No. 4,677,183.

[51] Int. Cl.$^4$ .................... C08G 63/12; C08G 63/62
[52] U.S. Cl. ...................... 524/611; 524/157; 528/176; 528/192; 528/195
[58] Field of Search ............ 528/176, 192, 195; 524/157, 611

[56] References Cited

U.S. PATENT DOCUMENTS 4,628,081 12/1986 Mark et al. .................. 528/195
4,677,183 6/1987 Mark et al. .................. 528/196

*Primary Examiner*—Harold D. Anderson
*Attorney, Agent, or Firm*—Martin B. Barancik

[57] ABSTRACT

High molecular weight thermoplastic aromatic carbonate resin exhibiting improved impact properties comprised of the polymerized reaction products of:
(i) at least one dihydric phenol;
(ii) a carbonate precursor; and
(iii) an amount effective to improve the impact properties of said resin of at least one polymer represented by the formula

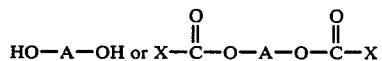

wherein A represents a divalent residue of at least one polymerized and partially hydrogenated conjugated alkadiene monomer and has a weight average molecular weight of at least about 600, and X is independently selected from halogen radicals.

11 Claims, No Drawings

POLYESTER CARBONATE CONTAINING DIVALENT RESIDUE OF POLYMERIZED, PARTIALLY HYDROGENATED CONJUGATED ALKADIENE MONOMER

This is a division of copending application Ser. No. 797,253, filed Nov. 12, 1985, now U.S. Pat. No. 4,677,183.

BACKGROUND OF THE INVENTION

Polycarbonates are well known thermoplastic materials which, due to their many advantageous properties, are used as thermoplastic engineering materials. The polycarbonates may generally be prepared by the reaction of a carbonate precursor such as phosgene with a dihydric phenol such as bisphenol-A. These polycarbonates exhibit, for example, excellent properties of toughness, flexibility, optical clarity, and good heat distortion temperatures. However, in certain applications better impact properties than thosepossessed by conventional polycarbonates are required. It is known that the impact properties of polycarbonates may be improved by blending with the polycarbonate resins certain impact modifiers. While the resultant compositions exhibit better impact properties than the unmodified polycarbonate resin alone, the use of impact modifier additives suffers from several disadvantages such as the fact that some of these impact modifiers tend to adversely affect the optical properties, such as transparency, of the polycarbonates.

It would be very advantageous if polycarbonates could be provided which exhibit improved impact prroperties and simultaneously retain the quite excellent optical properties of these conventional polycarbonate resins. It is, therefore, an object of the invention to provide carbonate polymers exhibiting improved impact properties.

SUMMARY OF THE INVENTION

In accordance with the instant invention there are provided novel carbonate resins exhibiting improved impact properties which are comprised of the polymerized reaction products of (i) at least one dihydric phenol, (ii) a carbonate precursor, and (iii) at least an impact improving amount of at least one polymer represented by the formulae

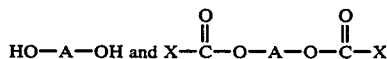

wherein A represents a divalent residue of a polymerized and partially hydrogenated conjugated alkadiene monomer and has a weight average molecular weight of at least about 600, and X is independently selected from halogen radicals.

DESCRIPTION OF THE INVENTION

It has been discovered that carbonate resins can be obtained which exhibit better impact properties than presently available conventional polycarbonate resins such as those obtained from a dihydric phenol and a carbonate precursor. The carbonate resins of the instant invention are comprised of the polymerized reaction products of (i) at least one dihydric phenol, (ii) a carbonate precursor, and (iii) an amount at least effective to improve the impact properties thereof of at least one polymer represented by the formula

and

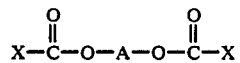

wherein A is selected from the divalent residues of polymerized, partially hydrogenated conjugated alkadiene monomers and has a weight average molecular weight of at least about 600, and X is independently selected from halogen radicals, preferably chlorine and bromine. The polymerized, partially hydrogenated conjugated alkadiene monomer residue represented by A has a weight average molecular weight of at least about 600, preferably at least about 800, and more preferably at least about 1,000. The upper range of the weight average molecular weight may be as high as about 20,000, preferably about 10,000.

The conjugated alkadiene monomers used in the preparation of A may be represented by the general formula

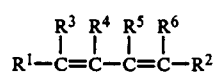

wherein $R^1$-$R^6$ are independently selected from hydrogen, halogen, and alkyl radicals, with the proviso that not more than two of $R^1$-$R^6$ are halogen radicals.

The preferred alkyl radicals are those containing from 1 to about 5 carbon atoms. These alkyl radicals include both the straight chain and branched alkyl radicals. However, the preferred alkyl radicals are the straight chain alkyl radicals. It is particularly preferred that if $R^1$ and/or $R^2$ are alkyl radicals that they be straight chain alkyl radicals The preferred halogen radicals are chlorine and bromine.

Preferred conjugated alkadiene monomers are those wherein $R^1$ and $R^2$ are independently selected from hydrogen and alkyl radicals. More preferred conjugated alkadiene monomers of Formula III are those wherein $R^1$-$R^6$ are independently selected from hydrogen and alkyl radicals, with the 1,3-alkadienes of this type being preferred.

Some illustrative non-limiting examples of conjugated alkadiene monomers of Formula III include 1,3-butadiene, 2-chloro-1,3-butadiene, 2-methyl-1,3-butadiene, 1,3-heptadiene, 2-methyl-1,3-pentadiene, 2-methyl-3-ethyl-1,3-butadiene, 2-ethyl-1,3-pentadiene, 1,3-hexadiene, and 2,4-hexadiene.

Particularly useful conjugated alkadiene monomers are 1,3-butadiene, 2-methyl-1,3-butadiene, and mixtures thereof.

The compounds of Formulae I and II, as well as the monomers of Formula III from which they are derived, are well known in the art which are generally commercially available or may be readily prepared by known methods. One of the methods for the preparation of the divalent residues of the polymerized and partially hydrogenated monomers of Formula III, i.e. the divalent residue A in Formulae I-II, involves the polymerization and partial hydrogenation of at least one monomer of Formula III. The polymerization process is described, inter alia, in Fred W. Billmeyer, Jr., *Textbook of Polymer*

*Science*, Interscience Publishers, New York, 1962, pages 192, 348–352 and 377–393, which is hereby incorporated by reference.

Hydrogenation of the polymer may be accomplished by techniques well known in the art. It may be accomplished utilizing a variety of hydrogenation catalysts such as nickel on kieselguhr, Raney nickel, copper chromate, molybdenum sulfide and finely divided platinum or other noble metals on a low surface area carrier.

Hydrogenation may be conducted at any desired temperature or pressure, e.g., from atmospheric to about 3000 psi. The usual range being between 100 and 1000 psi at temperatures from 75° F. to 600° F. for times between 0.1 and 24 hours, preferably from 0.2 to 8 hours.

Hydrogenation is not carried out to completion, but is only partial. That is, the partially hydrogenated polymer will have an average unsaturation of from about 10 to about 90%, preferably from about 20 to about 80%, and more preferably from about 30 to about 70% of the original value, i.e., the unsaturation value of the polymer which has not been hydrogenated. Thus, for example, if the residue A is derived from 1,3-butadiene it will contain recurring structural units represented by the following formulae

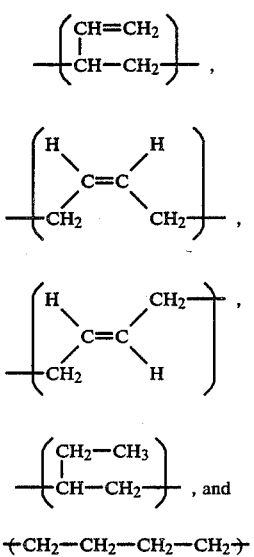

The divalent unsaturated residue of Formula IV is derived from 1,2-addition of the 1,3-butadiene monomer; the unsaturated residue of Formula IVa is derived from the cis-1,4 addition of the 1,3-butadiene monomer, the unsaturated residue of Formula IVb is derived from the trans-1,4 addition of the 1,3-butadiene monomer, the saturated residue of Formula IVc is derived from the 1,2-addition of the 1,3-butadiene monomer, and the saturated residue of Formula IVd is derived from the 1,4-addition of the 1,3-butadiene monomer. The amounts of recurring structural units IVc and IVd will depend upon the degree of hydrogenation. The greater the degree of hydrogenation the grearer the amounts of recurring structural units of Formulae IVc and IVd present in A. Conversely, the lower the degree of hydrogenation the smaller the amounts of recurring structural units of Formulae IVc and IVd present in A. Thus, for example, if A has an average degree of unsaturation of 10% it will contain, on the average, 90 mole % of recurring structural units IVc and IVd and 10 mole % of recurring units IV–IVb.

It is to be understood that A may contain the polymerized and partially hydrogenated products of one monomer of Formula III or it may contain the polymerized and partially hydrogenated products of a mixture of two or more different monomers of Formula III.

The partially hydrogenated residues A generally have an average degree of unsaturation of from about 10 to about 90%, preferably from about 20 to about 80%, and more preferably from about 30 to about 70%.

As mentioned previously A may have a weight average molecular weight as high as about 20,000. It is preferred that A have a weight average molecular weight between about 1,000 and 10,000.

The amount of compounds of Formulae I and/or II utilized in the preparation of the instant carbonate polymers is an amount at least effective to improve the impact properties, e.g., impact strength, of the carbonate resin. Generally, this amount is at least about 1 weight percent, preferably at least about 2 weight percent, more preferably at least about 3 weight percent, and most preferably at least about 4 weight percent. Weight percent of compounds I and/or II is based on the total amounts of compounds I and/or II and the dihydric phenol utilized in the preparation of the instant carbonate resins.

In general, if less than about 1 weight percent of compounds I and/or II is used there is no significant improvement in the impact properties of the resin.

If the amount of compounds I or II used is relatively large, e.g., in excess of about 40 weight percent, the resultant carbonate resins exhibit rubbery and elastomeric characteristics.

Thus the upper limit of said compounds that may be used is generally dependant upon the properties that it is desired for the carbonate resin to exhibit. Thus, for example, if it is desired to produce a resin exhibiting a high degree of rubbery or elastomeric properties relatively large amounts of the compounds of Formula I or II may be employed. If a resin exhibiting a lesser degree of rubbery or elastomeric properties is desired, a smaller amount of the instant compounds is employed.

Generally, the amount of compounds of Formula I or II used should not exceed about 75 weight percent, preferably about 70 weight percent.

Generally a resin which is derived from about 1 to about 40 weight percent, preferably from about 2 to about 30 weight percent, more preferably from about 3 to about 25 weight percent, and most preferably from about 4 to about 20 weight percent of the compounds of Formula I or II exhibits a particularly good mix of properties, e.g., improved impact strength as compared with conventional carbonate resins and a substantial degree of substantially most of the other advantageous physical properties of conventional carbonate resins. If impact strength is of importance than the amount of the instant compounds used should not exceed about 40 weight percent. If elastomeric or rubbery characteristics are important than the amount of the instant compounds used will generally be in excess of about 40 weight percent.

In the preparation of the instant carbonate polymers only one compound of Formula I or II may be used, or a mixture of two or more different compounds of Formula I or II may be used.

The dihydricphenols useful in the preparation of the carbonate polymers are well known and are described, inter alia, in U.S. Pat. Nos. 3,028,365, 2,999,835, 3,148,172, 3,271,368, 2,991,273, 3,271,367, 3,380,078, 3,041,891 and 2,999,846, all of which are incorporated herein by reference.

These dihdyric phenols will in general conform to the formula

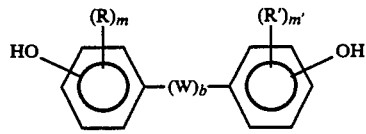

wherein:
R is independently selected from halogen, monovalent hydrocarbon, and monovalent hydrocarbonoxy radicals;
R' is independently selected from halogen, monovalent hydrocarbon, and monovalent hydrocarbonoxy radicals;
W is selected from divalent hydrocarbon radicals,

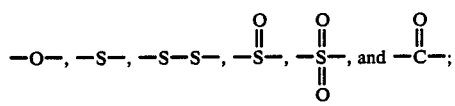

m and m' are independently selected from integers having a value of from 0 to 4 inclusive; and
b is either zero or one.

Preferred halogen radicals represented by R and R' are chlorine and bromine. The monovalent hydrocarbon radicals represented by R include alkyl, cycloalkyl, aryl, aralkyl, and alkaryl radicals.

The preferred alkyl radicals represented by R and R' are those containing from 1 to about 10 carbon atoms. The preferred cycloalkyl radicals represented by R and R' are those containing from 4 to about 8 ring carbon atoms. The preferred aryl radicals are those containing from 6 to 12 ring carbon atoms, i.e., phenyl, naphthyl, and biphenyl. The preferred aralkyl and alkaryl radicals are those containing from 7 to about 14 carbon atoms.

The monovalent hydrocarbonoxy radicals represented by R and R' have the general formula —OR", wherein R" has the same meaning as R and R'. The preferred hydrocarbonoxy radicals are the alkoxy and aryloxy radicals.

The divalent hydrocarbon radicals represented by W include the alkylene radicals, alkylidene radicals, cycloalkylene radicals, and cycloalkylidene radicals. Preferred alkylene radicals are those containing from 2 to about 30 carbon atoms. Preferred alkylidene radicals are those containing from 1 to about 30 carbon atoms. Preferred cycloalkylene and cycloalkylidene radicals are those containing from 6 to about 16 ring carbon atoms.

Some illustrative non-limiting examples of the dihydric phenols of Formula V include:
2,2-bis(4-hydroxyphenyl)propane (bisphenol-A);
2,2-bis(3,5-dimethyl-4-hydroxyphenyl)propane;
2,2-bis(3,5-dibromo-4-hydroxyphenyl)propane;
1,1-bis(4-hydroxyphenyl)cyclohexane;
1,1-bis(4-hydroxyphenyl)cyclododecane;
1,1-bis(3,5-dimethyl-4-hydroxyphenyl)cyclododecane;
1,1-bis(4-hydroxyphenyl)pentane;
bis(4-hydroxyphenyl)methane;
bis(3,5-diethyl-4-hydroxyphenyl)methane;
1,3-bis(4-hydroxyphenyl)propane;
4,4'-thiodiphenol; and
4,4'-dihydroxy-2,6-dimethyldiphenyl ether.

The carbonate precursors useful in the practice of the instant invention include the carbonyl halides, the bishaloformates, and the diaryl carbonates. The carbonyl halides include carbonyl chloride, carbonyl bromide, and mixtures thereof. The bishaloformates include the bishaloformates of dihydric phenols such as bisphenol-A, hydroquinone, and the like; and the bishaloformates of glycols such as ethylene glycol and neopentyl glycol. Typical of the diarylcarbonates are diphenyl carbonate and di(alkylphenyl)carbonates such as di(tolyl) carbonate. Some other illustrative examples of suitable diarylcarbonates include di(naphthyl) carbonate, phenyl tolyl carbonate and the like.

The preferred carbonate precursors are the carbonyl halides with carbonyl chloride, also known as phosgene, being the preferred carbonyl halide.

The polycarbonates of the instant invention may be prepared by known conventional methods such as for example interfacial polymerization, the pyridine process, melt polymerization, and the like. Particularly useful processes for the preparation of the polycarbonates of the instant invention are the interfacial polymerization process and the pyridine process.

The interfacial polymerization process involves the use of an aqueous caustic solution, an organic water immiscible solvent such as methylene chloride, at least one dihydric phenol of Formula V, and a carbonate precursor, at least one compound of Formulae I and/or II, a catalyst, and a molecular weight regulator.

The catalysts which may be employed can be any of the well known catalysts which catalyze the polycarbonate forming reaction. These catalysts include, but are not limited to, tertiary amines such as triethylamine, quaternary ammonium compounds, and quaternary phosphonium compounds.

The molecular weight regulators employed may be any of the known compounds that regulate the molecular weight of the carbonate polymer by a chain terminating mechanism. These compounds include, but are not limited to, phenol, tertiarybutyl phenol, chroman-I, and the like.

The pyridine process involves the use of an organic base such as pyridine, an organic solvent such as methylene chloride, at least one dihydric phenol of Formula V, a carbonate precursor, at least one compound of Formula I or II, a catalyst, and a molecular weight regulator.

Also included herein are the randomly branched thermoplastic polycarbonates. These randomly branched thermoplastic polycarbonates are prepared by utilizing a minor amount, typically between about 0.05 and 2.0 mole percent, based on the amount of dihydric phenol used, of a polyfunctional aromatic compound which functions as a branching agent. These polyfunctional aromatic compounds contain at least three functional groups which may be hydroxyl, carboxyl, carboxylic anhydride, haloformyl, and mixtures thereof Some illustrative non-limiting examples of these compounds include trimellitic anhydride, trimellitic acid, trimellityl trichloride, 4-chloroformyl phthalic anhydride, pyromellitic dianhydride, mellitic acid, mellitic anhydride, trimesic acid, and the like.

The polycarbonates of the instant invention have a weight average molecular weight of from about 20,000 to about 200,000, preferably from about 30,000 to about 150,000. They have an intrinsic viscosity, as measured in methylene chloride at 25° C., of at least about 0.4 dl/gm., preferably from about 0.45 to about 1.0 dl/gm.

If compounds of Formula I are utilized in the preparation of the instant polycarbonates it is preferred to use the pyridine process to form these polycarbonates. If, on the other hand, compounds of Formula II are used in the preparation of the instant polycarbonates it is preferred to use the interfacial polymerization process to form these polycarbonates.

Polycarbonates of the instant invention prepared by the pyridine process utilizing at least one compound of Formula I as one of the reactants contain the following recurring structural units:

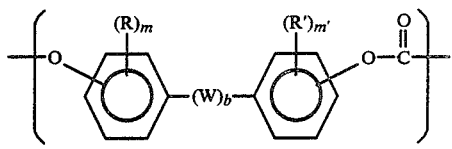

and

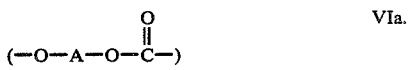

wherein R, R', W, A, m, m' and b are as defined hereinafore.

Polycarbonates of the instant invention prepared by the interfacial polymerizaiton process utilizing at least one compound of Formula II as one of the reactants contain the following recurring structural units:

VI, and

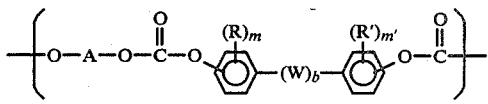

wherein R, R', W, A, m, m' and b are as defined hereinafore.

In the instant polycarbonates structural units VIa and VIb are present in amounts which are dependent upon the amounts of compounds of Formulae I and II, respectively, which are used in the formation of these polycarbonates.

The polycarbonates of the instant invention may optionally have admixed therewith the commonly known and used additives such as, for example, antioxidants; antistatic agents; inert fillers such as glass, talc, mica, and clay; ultraviolet radiation absorbers such as the benzophenones, benzotriazoles, and cyanoacrylates; hydrolytic stabilizers such as the epoxides; color stabilizers such as the organophosphites; and flame retardants.

Some particularly useful flame retardants are the alkali and alkaline earth metal salts of organic sulfonic acids. These types of flame retardants are disclosed, inter alia, in U.S. Pat. Nos. 3,933,734, 3,948,851, 3,926,908, 3,919,167, 3,909,490, 3,953,396, 3,931,100, 3,978,024, 3,953,399, 3,917,559, 3,951,910 and 3,940,366, all of which are hereby incorporated herein by reference.

Also included within the scope of the instant invention are the copolyester-carbonate resins. Briefly stated the copolyester-carbonates comprise recurring carbonate groups, carboxylate groups, and aromatic carbocylic groups in the linear polymer chain in which at least some of the carbonate groups and at least some of the carboxylate groups are bonded directly to the ring carbon atoms of the aromatic carbocyclic groups.

These copolyester-carbonate contain ester bonds and carbonate bonds in the polymer chain wherein the amount of ester bonds is from about 25 to about 90 mole percent, preferably from about 35 to about 80 mole percent. For example, 5 moles of bisphenol-A reacting completely with 4 moles of isophthaloyl dichloride and one mole of phosgene would give a copolyester-carbonate of 80 mole percent ester bonds.

The copolyester-carbonates of the instant invention are derived from (i) at least one dihydric phenol of Formula V, (ii) a carbonate precursor, (iii) an ester precursor, and (iv) an impact improving amount of at least one compound of Formula I or II.

The ester precursor is a difunctional carboxylic acid or an ester forming reactive derivative thereof. In general, any difunctional carboxylic acid or its ester forming reactive derivative conventionally used in the preparation of linear polyesters may be utilized in the preparation of the instant copolyester-carbonates. Generally, the difunctional carboxylic acids which may be used include the aliphatic carboxylic acids, the aliphatic-aromatic carboxylic acids, and the aromatic carboxylicacids. These acids are described in U.S. Pat. No. 3,169,121, which is hereby incorporated herein by reference.

The preferred difunctional carboxylic acids or their ester forming reactive derivatives are the aromatic carboxylic acids or their ester forming reactive derivatives. Particularly useful difunctional aromatic carboxylic acids are isophthalic acid, terephthalic acid, and mixtures thereof.

Instead of using the difunctional carboxylic acids as the ester precursor it is preferred to utilize their ester forming reactive derivatives. Thus, for example, instead of using isophthalic acid, terephthalic acid, or mixtures thereof it is preferred to use isophthaloyl dichloride, terepthaloyl dichloride, or mixtures thereof.

The copolyester-carbonates of the instant invention may be prepared by well known and conventional methods. These methods include transesterification, melt polymerization, interfacial polymerization, and the pyridine process. Various of these conventional methods are described in U.S. Pat. Nos. 3,169,121, 3,030,331, 3,207,814 and 4,188,314, all of which are incorporated herein by reference.

Particularly useful processes for the preparation of these copolyester-carbonates are the interfacial polymerization process and the pyridine process.

Copolyester-carbonates of the instant invention prepared by the pyridine process utilizing as the reactants (i) at least one dihydric phenol of Formula V, (ii) a carbonate precursor, (iii) at least one ester precursor, and (iv) an impact modifying amount of at least one compound of Formula I contain the following recurring structural units:

VI, VIa,

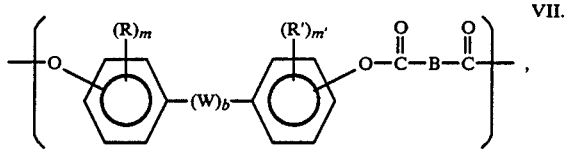

VII.

and

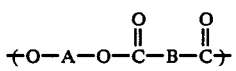

VIIa.

wherein A, R, R', m, m' W, and b are as defined hereinafore, and B is the residue of the ester precursor. B in Formulae VII and VIIa is preferably the residue of an aromatic dicarboxylic acid or its ester forming reactive derivative. such as, for example, the acid dichloride. Preferred residues of aromatic dicarboxylic acids or their ester forming reactive derivatives are represented by the Formula

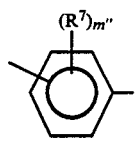

VIII.

wherein $R^7$ has the same meaning as R and R' above and m" is an integer having a value of from 0 to 4 inclusive. Preferably $R^7$ is independently selected from lower alkyl radicals containing from 1 to about 5 carbon atoms.

Copolyester-carbonates of the instant invention prepared by the interfacial polymerization process utilizing as the reactants (i) at least one dihydric phenol of Formula V, (ii) a carbonate precursor, (iii) at least one ester precursor, and (iv) at least one compound of Formula II, contain the following recurring structural units:

VI, VIb, VII, and

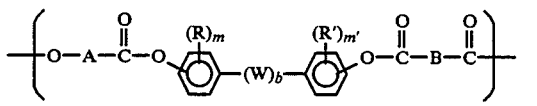

IX.

wherein A, B, R, R', m, m', b, and W are as defined hereinafore.

The amounts of structural units VIa, VIb, VIIa and IX present in the copolyester-carbonates will depend upon the amounts of the compounds of Formulae I or II used in the preparation of the copolyester-carbonates.

Also included within the scope of the instant copolyester-carbonate resins are the thermoplastic randomly branched copolyester-carbonate resins. These randomly branched thermoplastic resins are prepared by using the amounts and types of branching agents described hereinafore during the preparation of the instant copolyester-carbonates.

The copolyester-carbonates of this invention may optionally have admixed therewith the aforedescribed additives.

The instant copolyester-carbonates have a weight average molecular weight of from about 20,000 to about 200,000, preferably from about 25,000 to about 150,000.

These copolyester-carbonates have an intrinsic viscosity, as measured in methylene chloride at 25° C., of at least about 0.4 dl/gm, preferably from about 0.45 to about 1.0 dl/gm.

DESCRIPTION OF THE PREFERRED EMBODIMENT

In order to more fully and clearly illustrate the present invention the following examples are set forth. It is intended that the examples be considered as illustrative of rather than limiting the invention as disclosed and claimed herein. In the examples all parts and percentages are on a weight basis unless otherwise indicated.

The following example illustrates the preparation of a partially hydrogenated poly(butadiene)diol, i.e., a compound of Formula I.

EXAMPLE 1

A solution of 110 grams of commercially available poly(butadiene)diol (average molecular weight of 2,800, containing 20% 1,2-, 20% cis-1,4-, and 60 percent trans-1,4-) in 150 milliliters of dry ether was hydrogenated in a pressure bottle on a Parr shaker at 60 psi of hydrogen in the presence of 2.8 grams of 5% palladium on charcoal. The system was repressurized repeatedly until no more hydrogen was absorbed. The total hydrogen consumed corresponded to 85 psi. After purging with nitrogen the catalyst was filtered off and the solvent stripped. Infrared analysis of the colorless viscous oil indicated only traces of the vinyl and cis unsaturation, but the presence of the trans-substituted double bond at 974 cm$^{-1}$ and hydroxyl function in the 3,200–3,500 cm$^{-1}$ region.

The following example illustrates the preparation of a partially hydrogenated poly(butadiene) bischloroformate, i.e., a compound of Formula II.

EXAMPLE 2

Into a cold (7°–15° C.) solution of 313 grams of partially hydrogenated poly(butadiene)diol (prepared substantially in accordance with the procedure of Example 1) in 300 grams of methylene chloride, which was placed in a 1 liter 3-neck flask provided with a stirrer, thermometer, gas-inlet tube and dry ice condenser, there was introduced gaseous phosgene at a rate of 0.5 gram/minute until an excess of phosgene was indicated by its refluxing in the dry ice condenser. A total of 40 grams of phosgene was introduced. Purging overnight by nitrogen was followed by stripping of the solvent in vacuum, which left behind a very thick, pale yellow syrup, whose analysis by infrared indicated the presence of chloroformates at 1,786 cm$^{-1}$ and the absence of both phosgene at 1,825 cm$^{-1}$ and of the carbonate linkage at 1,750 cm$^{-1}$.

The following example illustrates the preparation of a conventional prior art polycarbonate falling outside the scope of the instant invention. This examples is presented for comparative purposes.

EXAMPLE 3

Into a mixture of 2283 grams of 2,2-bis(4-hydroxyphenyl)propane, 5700 grams water, 9275 grams methylene chloride, 30.1 grams phenol, and 10.0 grams triethylamine were introduced, at ambient temperature, 1180 grams of phosgene over a period of 97 minutes while maintaining the pH of the two phase system at about 11, i.e., 10–12.5, by simultaneously adding a 25% aqueous sodium hydroxide solution. At the end of the phosgene addition period the pH of the aqueous phase was 11.7 and the bisphenol-A content of this phase was less than about 1 part per million (ppm) as determined by ultraviolet analysis. The methylene chloride phase was separated from the aqueous phase, washed with an excess of dilute (0.01 N) aqueous HCl and then washed three times with water. The polymer was precipitated by steam and dried at 95° C. The resultant, substantially pure bisphenol-A polycarbonate, which had an intrinsic viscosity in methylene chloride at 25° C. of 0.554 dl/gm, was fed to an extruder, which extruder was operated at about 550° F., and the extrudate was comminuted into pellets. The pellets were then injection molded into test samples measuring 125 and 250 mils thick for impact strength determination according to the Notched Izod test, ASTM D-256, and for heat distortion temperature under load (HDTUL) determination ASTM D-648. Additionally the second order glass transition temperature (Tg) of the resin was determined.

The results of these tests are set forth in Table I.

The following example illustrates the preparation of a polycarbonate resin of the instant invention.

EXAMPLE 4

This example illustrates the preparation of a polycarbonate resin derived from bisphenol-A and a partially hydrogenated poly(butadiene)bischloroformate. The procedure of Example 3 is substantially repeated except that only 25 grams (2.7 mole %) of the phenol chain stopper were used and a methylene chloride solution of 114.2 grams (5 wt. %) of a partially hydrogenated poly(butadiene)bischloroformate prepared substantially in accordance with the procedure of Example 2 was added to the reaction mixture prior to the begining of phosgenation.

The resultant polymer had an intrinsic viscosity, as measured in methylene chloride at 25° C., of 0.588 dl/gm. The HDTUL, Notched Izod, and Tg of the polycarbonate were determined and the results are set forth in Table I.

The second order glass transition temperature (Tg) was determined using a Perkins-Elmer DSC-2B instrument which measures the second order glass transition temperature by differential scanning calorimetry.

TABLE I

| Example No. | Notched Izod (ft.lb./in.) | | Tg (°C.) | HDTUL (°C.) (at 264 psi) |
|---|---|---|---|---|
| | 125 mil | 250 mil | | |
| 3 | $18.1^{100*}$ | $2.1^0$ | 148 | 132.6 |
| 4 | $18.3^{100}$ | $11.1^{100}$ | 147 | 126.7 |

*The superscripts indicate the percent ductility of the samples.

As illustrated by the data in Table I a polycarbonate of the instant invention (Example 4) which is derived from 5 weight percent partially hydrogenated poly(butadiene)bischloroformate and 95 weight percent bisphenol-A has a much better impact strength, at thick section, than does the conventional prior art polycarbonate (Example 3) which is derived from bisphenol-A Additionally, the test samples from Example 4 were subjected to visual inspection and were found to be transparent.

In general, the instant carbonate polymers may be described as being multi-phase block copolymers.

The instant carbonate polymers may be used to prepare molded articles, glazing material, and the like.

The foregoing detailed description has been given for clearness of understanding only and no unnecessary limitiations are to be understood therefrom. The invention is not limited to the exact details shown and described for obvious modifications may occur to those skilled in the art.

What is claimed is:

1. A copolyestercarbonate resin comprised of
   (i) at least one recurring structural unit represented by the formula

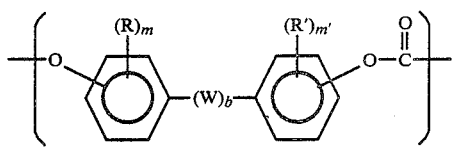

(ii) an amount at least effective to improve the impact properties of said resin of at least one recurring structural unit represented by the formula

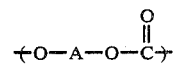

or

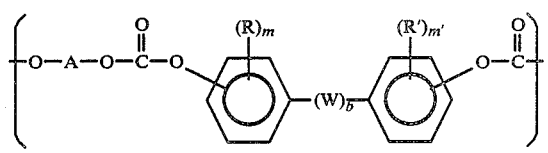

(iii) at least one recurring structural unit represented by the formula

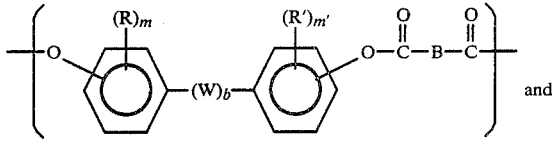

and (iv) at least one recurring sructural unit represented by the formula

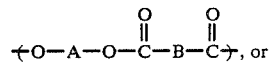

or

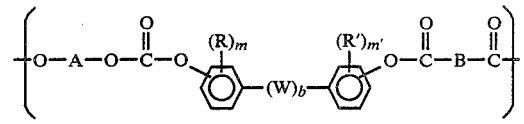

wherein
   R is independently selected from halogen, monovalent hydrocarbon or monovalent hydrocarbonoxy radicals,
   R' is independently selected form halogen, movovalent hydrocarbon or monovalent hydrocarbonoxy radicals,
   W is selected from divalent hydrocarbon radicals,

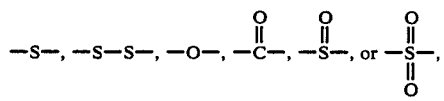

A is the divalent residue of a polymerized and partially hydrogenated conjugated alkadiene and has a weight average molecular weight of at least about 600, m an m' are independently selected form integers having a value of from 0 to 4 inclusive, and b is either zero or one, wherein B is the divalent residue of an ester precursor selected form difunctional carboxylic acids or their ester forming reactive derivatives, (ii) and (iv) being present in an amount effective to improve the impact properties of said resin.

2. The resin of claim 1 whrein B is the divalent residue of an aromatic ester precursor selected from difunctinal aromatic acids or their ester forming reactive derivates.

3. The resin of claim 2 wherein B is represented by the formula

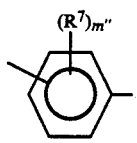

wherein $R^7$ is independenetly selected from halogen, monovalent hydrocarbon, or monovalent hydrocarbonoxy radicals, and m'' has a value of from 0 to 4 inclusive.

4. The resin of claim 3 wherein said monovalent hydrocarbon radicals represented by $R^7$ are selected from alkyl, cycloalkyl, aryl, aralkyl or alkaryl radicals.

5. The resin of claim 4 wherein $R^7$ is independently selected from alkyl radicals.

6. The resin of claim 1 wherein (iv) is at least one recurring structural unit represented by the formula

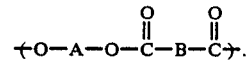

7. The resin of claim 6 wherein (ii) is at least one recurring structural unit represented by the formula

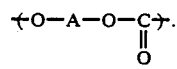

8. The resin of claim 1 wherein (iv) is at least one recurring structural unit represented by the formula

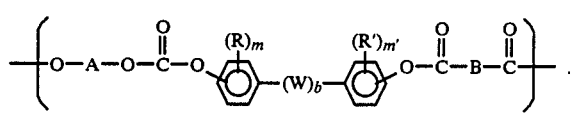

9. The resin of claim 8 wherein (ii) is at least one recurring structural unit represented by the formula

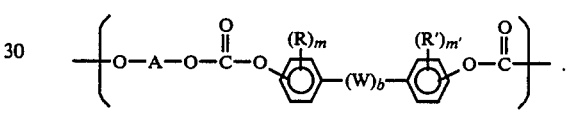

10. The resin of claim 1 which contains admixed therewith a flame retardant amount of at least one flame retardant compound.

11. The resin of claim 10 wherein said flame retardant compound is selected form tha alkali or alkaline earth metal salts of organic sulfonic acids.

* * * * *